(12) United States Patent
Oliver et al.

(10) Patent No.: US 10,780,830 B2
(45) Date of Patent: Sep. 22, 2020

(54) MOUNTED RETRACTABLE CATWALK FOR TRUCKS, UTILITY, CONSTRUCTION, AND INDUSTRIAL VEHICLES AND EQUIPMENT

(71) Applicant: ANDERSON & WOOD CONSTRUCTION CO., INC., Meridian, ID (US)

(72) Inventors: Fred S. Oliver, Eagle, ID (US); Michael R. Bruett, Caldwell, ID (US); Chase C. Oliver, Meridian, ID (US); Lee M. Ward, Meridian, ID (US)

( * ) Notice: Subject to any disclaimer, the term of this patent is extended or adjusted under 35 U.S.C. 154(b) by 1 day.

(21) Appl. No.: 15/936,973

(22) Filed: Mar. 27, 2018

(65) Prior Publication Data

US 2018/0272951 A1    Sep. 27, 2018

Related U.S. Application Data

(60) Provisional application No. 62/477,362, filed on Mar. 27, 2017.

(30) Foreign Application Priority Data

May 1, 2017    (CA) ...................................... 2965639

(51) Int. Cl.
    *B60R 3/00*    (2006.01)
(52) U.S. Cl.
    CPC .................... *B60R 3/005* (2013.01)
(58) Field of Classification Search
    CPC ................................................... B60R 3/005
    See application file for complete search history.

(56) References Cited

U.S. PATENT DOCUMENTS

| 2,767,032 A | 10/1956 | Mitchell |
| 3,110,359 A | 11/1963 | Solomon |
| 3,493,079 A | 2/1970 | Dudschus |
| 3,601,220 A | 8/1971 | Saucier |

(Continued)

OTHER PUBLICATIONS

Kringstad Ironworks, Folding Catwalks, http://kringstadiron.com/products_fcatwalks.cfm, at least as early as Dec. 12, 2016.

(Continued)

*Primary Examiner* — Alvin C Chin-Shue
(74) *Attorney, Agent, or Firm* — Pedersen & Company, PLLC; Ken J. Pedersen; Barbara S. Pedersen

(57) ABSTRACT

A catwalk includes a mounting frame or other connection to a side of a vehicle/equipment, a floor, and at least one railing; an actuator system for moving the catwalk enclosure between retracted and deployed positions; and a guide arm for guiding/controlling pivoting of the railing relative to the floor. The actuator system and guide arm are preferably substantially or entirely outside of the catwalk walkway space where a user walks or stands, thereby providing easy access to the walkway at one or both ends and obstacle- and barrier-free passage from one catwalk to another on the same vehicle/equipment. The actuator system prevents the catwalk from collapsing/retracting when a person is on the catwalk, for example, by the lift capacity of a hydraulic or pneumatic cylinder being controlled/tuned so that the cylinder does not have the capacity/capability to lift and retract the catwalk when the catwalk is occupied.

30 Claims, 16 Drawing Sheets

Fig. 7

(56) References Cited

U.S. PATENT DOCUMENTS

| | | | |
|---|---|---|---|
| 3,989,122 A | 11/1976 | Jenkins | |
| 4,371,056 A | 2/1983 | Anglade | |
| 4,408,948 A | 10/1983 | Robinson | |
| 4,613,155 A * | 9/1986 | Greenwood | A01C 15/003 |
| | | | 105/457 |
| 4,936,407 A | 6/1990 | Brock et al. | |
| 5,634,681 A | 6/1997 | Gionta | |
| 5,799,962 A * | 9/1998 | Barnhart | B60R 3/02 |
| | | | 108/131 |
| 6,045,157 A | 4/2000 | Poulin | |
| 6,068,277 A * | 5/2000 | Magnussen | E02F 9/0833 |
| | | | 280/166 |
| 6,431,093 B1 | 8/2002 | Hansen | |
| 6,494,291 B2 | 12/2002 | Ono | |
| 6,598,704 B2 | 7/2003 | Hansen | |
| 7,174,993 B2 | 2/2007 | Lantz | |
| D670,639 S | 11/2012 | Hanks et al. | |
| 8,317,249 B2 * | 11/2012 | Slater | B60R 3/005 |
| | | | 296/26.01 |
| 8,632,099 B2 | 1/2014 | Conny et al. | |
| 8,745,799 B1 | 6/2014 | Thomasson et al. | |
| 9,470,050 B2 | 10/2016 | Yorga et al. | |
| 2002/0189503 A1 * | 12/2002 | Hansen | B60R 3/005 |
| | | | 108/44 |
| 2003/0020253 A1 * | 1/2003 | Bosman | B60R 3/005 |
| | | | 280/164.1 |
| 2013/0187351 A1 * | 7/2013 | Reguis | A63C 5/0405 |
| | | | 280/28 |
| 2017/0144603 A1 * | 5/2017 | Matthiesen | B60R 3/005 |
| 2017/0283010 A1 * | 10/2017 | Dishon | B63B 27/143 |
| 2018/0215421 A1 * | 8/2018 | Claerhout | A01D 41/1261 |

OTHER PUBLICATIONS

Aquaneering, Truck-Mounted Pneumatic Walkway, http://www.aquaneer.com/stainless_steel_fish_transport_tanks.php, at least as early as Dec. 12, 2016.

Kleint Industries, Truck Mounted Pull Out Walkway, http://www.kleintindustries.com.au/support-trucks, at least as early as Dec. 12, 2016.

Truckstanks.com, Safety Handrail System, https://trucktanks.com/handrail-safety-system-truck-trailer!, at least as early as Dec. 12, 2016.

\* cited by examiner

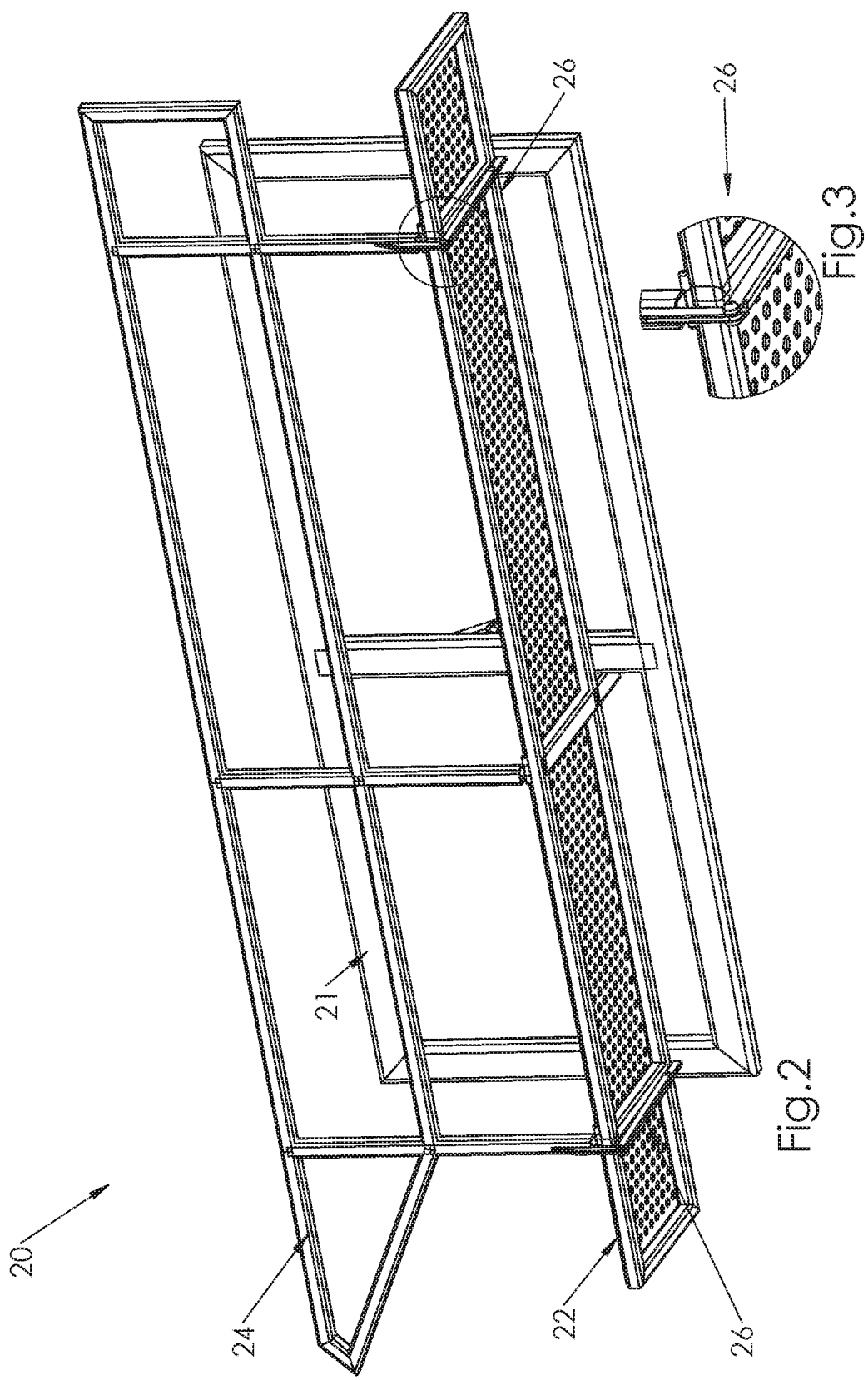

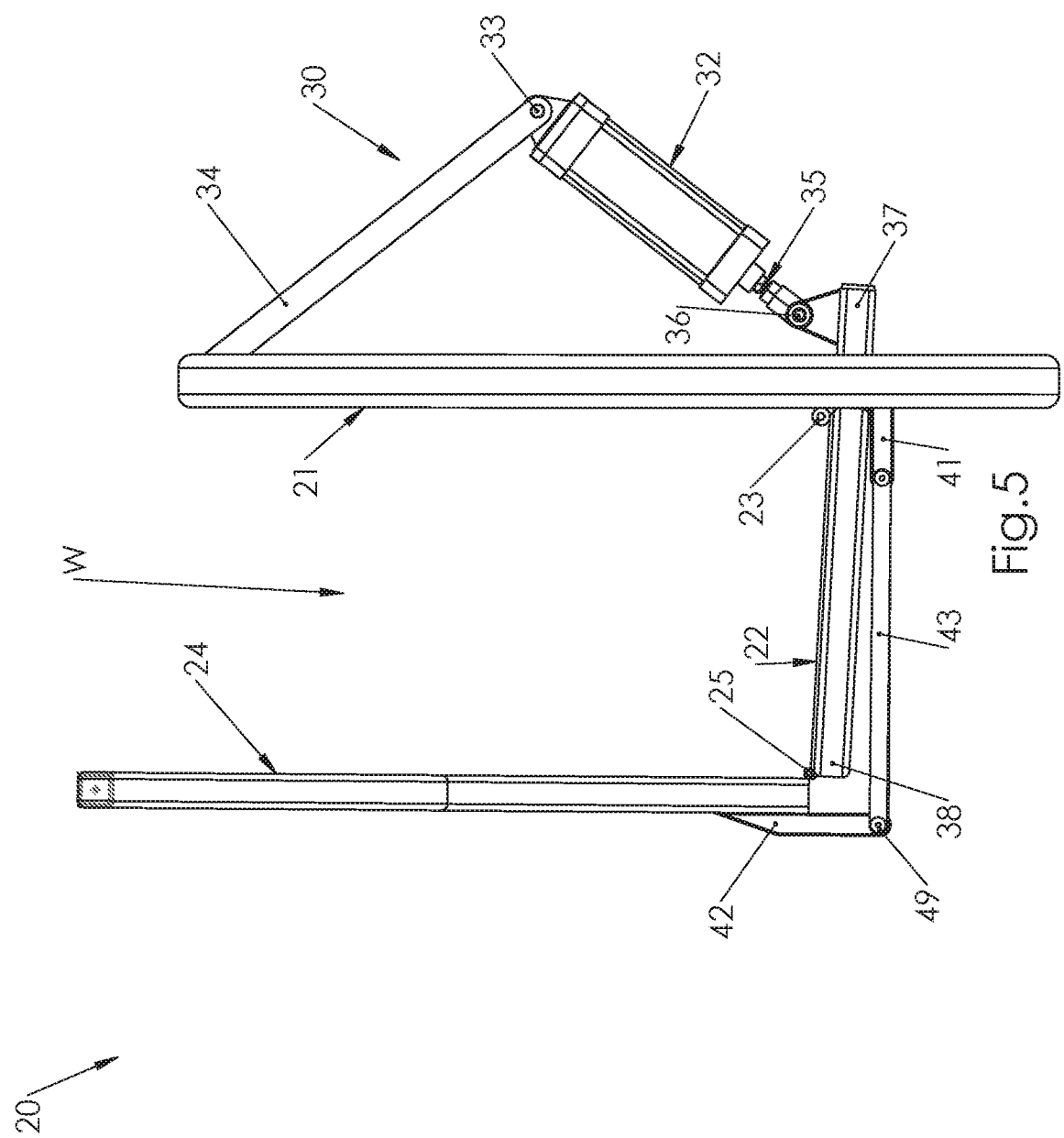

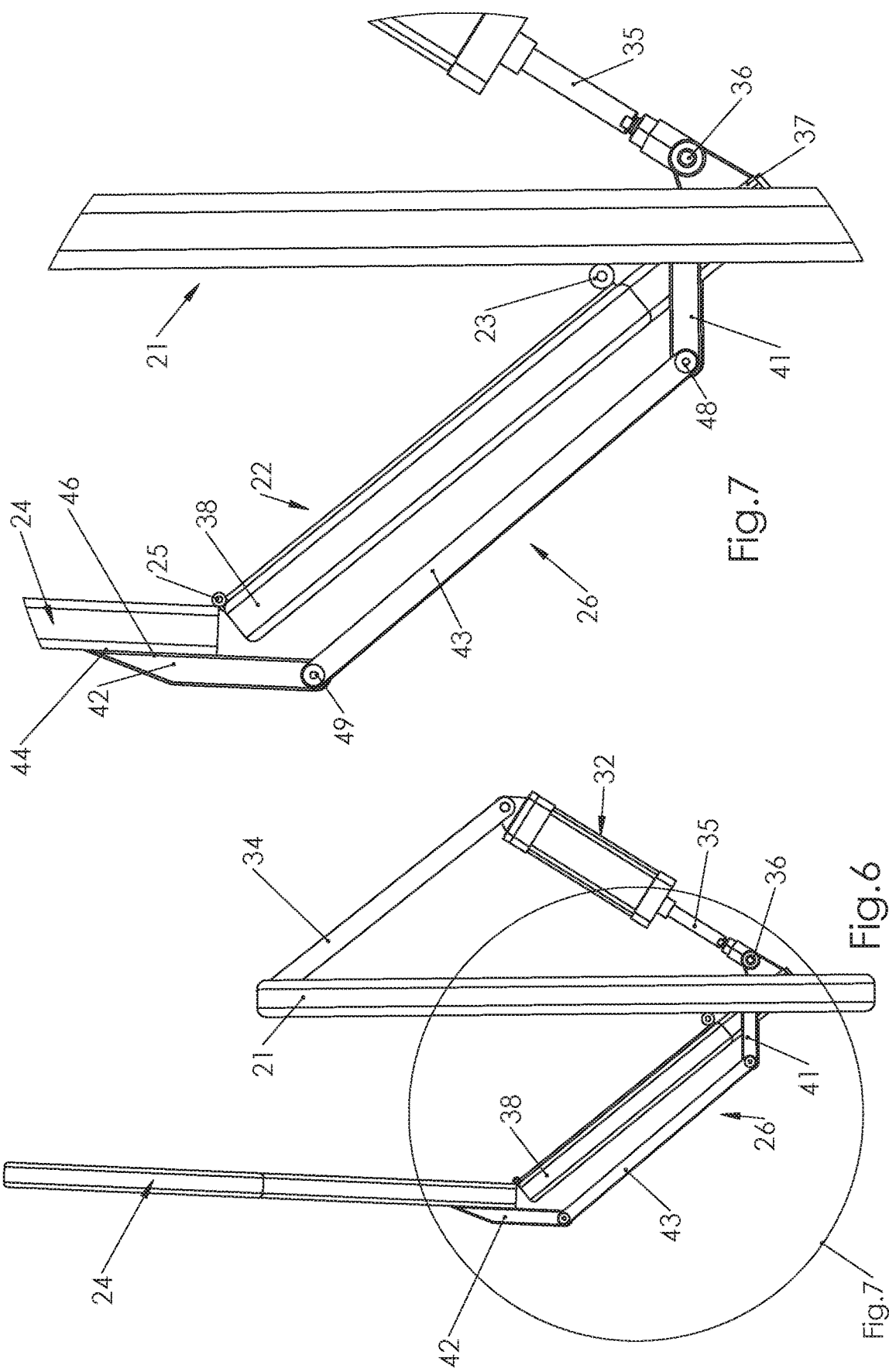

MOUNTED RETRACTABLE CATWALK FOR TRUCKS, UTILITY, CONSTRUCTION, AND INDUSTRIAL VEHICLES AND EQUIPMENT

This application claims benefit of U.S. Provisional Application Ser. No. 62/477,362, filed Mar. 27, 2017, and claims priority of Canadian Application No. 2,965,639, filed May 1, 2017, wherein both of which applications are entitled "Mounted Retractable Catwalk for Trucks, Utility, and Industrial Vehicles and Equipment", and wherein the entire disclosures of both applications being incorporated herein by this reference.

BACKGROUND

Field of the Invention

The invention relates to catwalks that include an elevated walkway for one or more persons who need to walk or stand in the elevated position on a vehicle or equipment, for example, to work on part of, or on equipment mounted on, a truck or other utility, construction, or industrial vehicles or equipment.

The floor of the catwalk elevates the person, allowing access to the bed of the vehicle and/or vehicle-mounted components therein, while the railing(s) allow(s) for hands-free movement by preventing the person from falling off of the catwalk platform. More specifically, the invention may comprise a foldable/collapsible catwalk for front, side, and/or rear mounting on a vehicle/equipment. The invention may allow particularly effective and efficient movement of the catwalk, between a retracted position and a deployed/in-use position, and also effective and safe movement of a user on the catwalk and between multiple catwalks on a vehicle or equipment. In the retracted position, the catwalk is collapsed to a compact form/configuration against the side of the vehicle or equipment for safe and convenient travel of the vehicle or equipment on- or off-road and for secure and convenient storage of the vehicle or equipment.

Related Art

Patent literature discloses railings that may be moved between a compact, stored form and position to an in-use form and position, so that a user may walk/stand on top of a tank trailer ("tanker") and be protected by the railings from falling off the tank. A railing is raised at one or both edges of the top of the tank so that the user may walk/stand on top of said tank. Examples of these tanker safety railings include: Brock U.S. Pat. No. 4,936,407; Lantz U.S. Pat. No. 7,174,933; Poulin U.S. Pat. No. 6,045,157; and Bossman Publication No. 2003/0020253.

Hansen U.S. Pat. No. 6,598,704 discloses a catwalk that is hung/attached to the side of a truck bed. The Hansen device includes a floor and a side-railing and can be folded up along the side of the truck bed. The Hansen device is manually-operated by use of a handle. The Hansen device hangs the deployed floor from two chains, which, by their position and length, prevent the floor from pivoting downward farther than desired. Each chain extends, from near the truck bed, down and outward to the bottom edge of the floor of the catwalk, and the chain length limits the downward pivoting of the floor.

Commercial internet advertising by AQUANEERING™ discloses a catwalk for a fish transport tank, wherein the catwalk is a rigid unit comprising a floor and railing that do not pivot or move relative to each other. The entire catwalk (floor and railing together as a unit) pivots up over the tank for storage/transport, placing the floor against the side of the tank and the railing (still at 90 degrees to the floor) over the top of the tank.

Ono U.S. Pat. No. 6,494,291 discloses a foldable gondola-like scaffold device, which can be hung from a support beam such as an I-beam. The gondola cage has a floor and a railing that are pivotal relative to each other, for being moved from a collapsed form to a deployed form, either manually and/or by the force of the weight of the gondola components. The Ono device hangs the deployed gondola cage from two link members (each made of link plates 10a, 10b), wherein each link member, by its position and length, prevents the cage from pivoting downward farther than desired. Each link member extends from the top of the cage's rear frame structure, down and outward to the top of the device's front frame structure. The link members support said front frame structure in a position spaced outwardly from said rear frame structure, and the link member length limits the downward pivoting of the cage and floor.

There is still a need for an improved catwalk that provides a walkway at an elevated position beside the bed or platform of utility, construction, and industrial vehicles or equipment, for safe work or monitoring of the equipment on the bed or platform. Certain embodiments of the invented catwalk meet this need, while also providing safety features during use, and a small-footprint when retracted for storage or travel.

SUMMARY OF THE INVENTION

The invention comprises a catwalk or elevated walkway device and methods of using the device. The catwalk/walkway device comprises a floor and at least one railing that together form the walkway of the catwalk; an actuator system for moving the catwalk enclosure between a retracted position/configuration and a deployed position/configuration; and a guide arm system for guiding/controlling the pivoting of the railing relative to the floor, during movement of the catwalk and when the catwalk is in the deployed and/or retracted positions. The catwalk device may comprise a mounting frame, or other means of connection to a vehicle or equipment. Certain embodiments of the catwalk device may be adapted for installation and use in various locations on the vehicle/equipment, for example, to serve as front-mounted, left or right side-mounted, and/or rear mounted catwalks.

Certain embodiments of the actuator system and guide arm system of the catwalk or elevated walkway device (hereafter, simply "catwalk") are specially-adapted to provide a sleek design combined with effective operation. The actuator system may comprise a hydraulic or pneumatic cylinder(s) and actuator linkage(s) that are provided substantially or entirely outside of the walkway, typically between the walkway and the vehicle/equipment. Furthermore, the guide arm system may be provided substantially or entirely below and/or outside the floor and outer surface of the railing. Thus, preferably no portion of the actuator system or guide arm system protrudes into or across the walkway or the walkway ends. For example, there are preferably no bars or protrusions that the user must walk over or around when moving from one end of the walkway to another. For example, there are preferably no obstructions or protrusions bars, chains, link members, or other barriers protruding into or extending across the open ends of the catwalk walkway.

Therefore, certain embodiments of the catwalk may be described as "supported catwalks" that are supported in both deployed and retracted conditions/configurations, and during transition between these conditions/configurations, by guide arm and/or actuator systems that are substantially or entirely below and/or outside the walkway of the catwalk. These supported catwalks may be differentiated from suspended catwalks that hang the catwalk floor(s) and/or outer railing(s) from chains and/or other linkages. As in Hansen U.S. Pat. No. 6,598,704 and Ono U.S. Pat. No. 6,494,291, for example, chains or other linkages of a suspended catwalk/cage device are typically anchored at their upper ends to member(s)/structure above the catwalk floor and extend down from the anchor points to connect at their lower ends to the catwalk floor or outer railing.

The supported-catwalk design of certain embodiments results in a lack of barriers/obstruction at the ends of the walkway, which may provide one or more of the benefits of: easy access to the walkway at one or both ends, for example, from a ladder(s) and/or from a cab or other platform of the vehicle/equipment; obstacle- and barrier-free passage from one catwalk to another on the same vehicle/equipment. For example, said obstacle- and barrier-free passage may be between a left-side and/or right-side mounted catwalk and a front-side and/or rear-side mounted catwalk of the same or similar construction and operation. In other words, access points may be at one or both ends of each catwalk, and/or the user may walk easily between adjacent catwalks provided on multiple sides (left, right, rear, or even front end) of the vehicle/equipment.

Preferred embodiments enhance safety by hindering or preventing the catwalk from retracting when a person is on the catwalk. This is preferably accomplished by designing and tuning the actuator system so that it is not capable of retracting the catwalk when a person is on the catwalk. The catwalk is deployed when the hydraulic and/or pneumatic cylinder(s) are in a retracted condition, and the cylinder(s) must extend/lengthen in order to retract the catwalk. Thus, when no pressure is applied to the cylinder(s), the catwalk remains in a fail-safe, deployed position. When pressure is supplied to the cylinder(s), the pressure determines/controls the lift capacity of the cylinder(s), and the preferred embodiments limit the maximum pressure so that the cylinder(s) do not have the capacity/capability to retract the catwalk when occupied. The pressure of the preferred catwalk actuator system is pre-set by tuning the hydraulic valve that supplies the cylinder to ensure it has enough pressure to operate the cylinder and lift (retract) the catwalk, but not enough to overcome the added weight of a person on the catwalk. This safety feature is therefore accomplished automatically by tuning the cylinder to an account for the minimum expected weight of a person, before or during installation of the catwalk, so that accidental or even purposeful actuation of the cylinder will not cause or allow the catwalk to retract while a person is using the catwalk. This safety feature is therefore provided without the implementation or required use of complex controls, safety switches, or locks that must be remembered and properly operated by personnel. The chance of improper use, damage, or tampering with this safety feature is minute to non-existent.

Additional and alternative features of the invention will be apparent from the following description and the drawings.

BRIEF DESCRIPTION OF THE DRAWINGS

Regarding the drawings, the terms "right", "left", "front", and "rear" are used from the perspective of a driver of the vehicle/equipment to which the catwalk is typically attached.

FIG. 2 is a left-side, bottom perspective view of another embodiment of the invented catwalk, in deployed position/configuration, wherein this catwalk is longer from end to end, but of about the same height and width as the catwalk in FIG. 1, and wherein the vehicle/equipment to which the catwalk would typically be connected during use is not shown.

FIG. 3 is an enlarged view of a detail circled in FIG. 2.

FIG. 5 is a rear end view of the embodiment of FIG. 2, still in the deployed condition.

FIG. 6 is a rear end view of the embodiment of FIG. 2, wherein the catwalk is being retracted so that it is part-way between the deployed position and the retracted (or "collapsed", "folded", or "lifted") position.

FIG. 7 is an enlarged view of the detail circled in FIG. 6.

FIG. 11 is a rear perspective view of a left-side-mounted catwalk and a rear-side-mounted catwalk, according to certain embodiments of the invention, operatively connected to a cable reel truck and in deployed position.

FIG. 12 is a rear perspective view of the left-side-mounted catwalk and rear-side-mounted catwalk of FIG. 11, both partially retracted, for example, in "half-stroke" position due to the cylinders of their respective actuator systems being approximately half-extended.

FIG. 13 is a rear perspective view of the two catwalks of FIGS. 11 and 12 in fully-retracted position.

FIG. 14 is a right perspective view of the rear ends of the cable reel truck and left-side and rear-side catwalks of FIGS. 11-13, plus an embodiment of a right-side-mounted catwalk according to the invention, wherein all three catwalks are in deployed position.

FIG. 15 is a right perspective view of the rear ends of the truck and catwalks of FIG. 14, wherein all three catwalks are partially retracted, for example, in "half-stroke" position.

FIG. 16 is a right perspective view of the rear end of the truck and the catwalks of FIGS. 14 and 15, wherein all three catwalks are fully-retracted.

FIG. 17 is a rear view of the vehicle and catwalks of FIGS. 11-16, wherein all three catwalks are fully-extended.

FIG. 18 is a left perspective view of the vehicle and catwalks of FIGS. 11-17, wherein all three catwalks are fully-extended.

DETAILED DESCRIPTION OF PREFERRED EMBODIMENTS

Referring to the Figures, there are shown some, but not the only, embodiments of a retractable catwalk, such as may be mounted on and used on various vehicles and/or equipment. For example, the catwalk may be mounted on a truck, trailer, utility vehicle and/or a construction vehicle. The preferred embodiments meet OSHA safety requirements while embodying an effective, efficient, and sleek design that provides a walkway with few to no obstacles or trip-hazards when deployed and that retracts to a very compact, vertical profile with a small footprint.

Certain embodiments of the catwalk are adapted for mounting on one or more sides, and/or on any side, of the vehicle/equipment, for example, to the right, left, rear, and/or front side of a vehicle/equipment bed/platform that is hard or impossible to reach unless the person is elevated above the road/ground. Typically, the catwalk is connected to a structure at or near an outer side of the vehicle/equipment at least several feet above the road/ground, either by connection of a mounting frame of/for the catwalk to the vehicle/equipment, or by direct connection of the catwalk to the vehicle/equipment without the use of a mounting frame. Typically the catwalk is not mounted above and does not extend up above the top extremity horizontal plane of the vehicle/equipment, which is one of several ways that the catwalk is differentiated from railings provided on top of a tanker.

Therefore, the preferred embodiments provide safe access to much or all of the vehicle/equipment from positions at or near the upper and side perimeters of said vehicle/equipment. The preferred embodiments increase the ease and safety of work, monitoring and maintaining of equipment, and movement between areas of the truck/equipment. These benefits are accomplished without affecting, or, at most only very minimally affecting, the outside dimensions of the vehicle/equipment on which the catwalk is installed.

Figure 1:
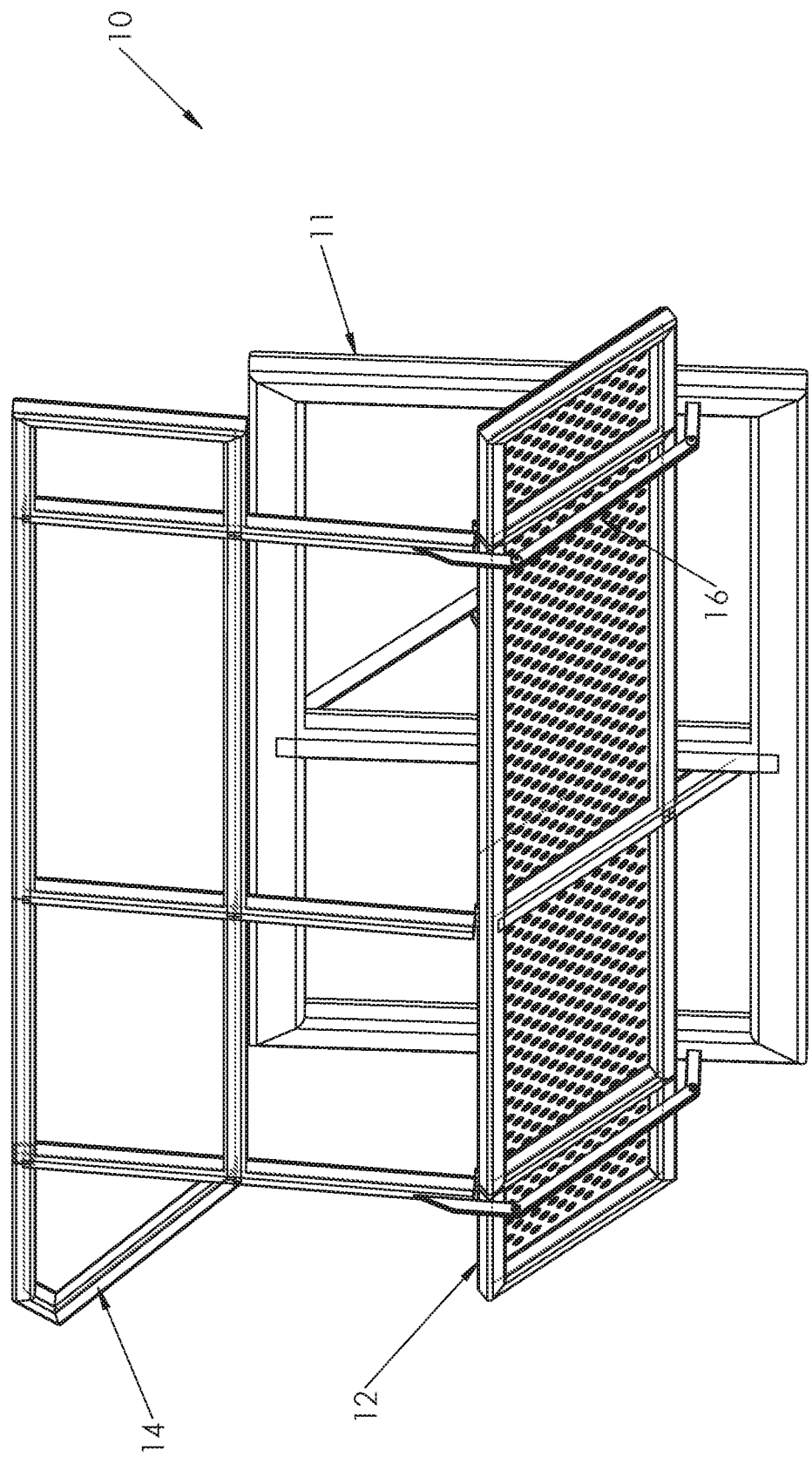
FIG. 1 is a left-side, bottom perspective view of one embodiment of the invented catwalk, in a partially deployed (or "partially extended" or "partially lowered") position/configuration, for example, about half way between the deployed and retracted positions/configurations, wherein the vehicle/equipment to which the catwalk would typically be connected during use is not shown.

A catwalk 10 according to certain embodiments of the technology is shown in FIG. 1. The catwalk 10 may be described as comprising, or being connected to, a mounting frame 11 for connection to the vehicle/equipment (hereafter "vehicle") and preferably for providing a hand-hold and/or barrier to prevent the user from falling off the catwalk toward/onto equipment in/on the vehicle, that is, in a direction opposite the catwalk outer railing. Further, the catwalk 10 comprises a floor 12 and at least one railing 14 that, together with the mounting frame 11, form/define the walkway of the catwalk. Further, the catwalk 10 comprises a hydraulic or pneumatic actuator system (not visible in FIG. 1) for moving the catwalk between a retracted configuration and position and a deployed configuration and position. Further, the catwalk 10 comprises a guide arm system 16 for guiding/controlling the pivoting of the railing 14 relative to the floor 12, and therefore the pivoting of the railing 14 relative to the mounting frame 11 and the vehicle/equipment, during said moving and when the catwalk is in both the retracted and the deployed positions. The catwalk 10 in FIG. 1 is about midway between the retracted and deployed positions, so that the floor 12 (or "main plane of the floor") is at about 45 degrees from horizontal. When the catwalk is in this midway position, each of the inner portion/end and the outer portion/end of the guide arm 16 are at obtuse angle(s) to the middle portion/arm of the guide arm 16, for example, at about 135 degrees to the middle portion/arm.

Figure 4:
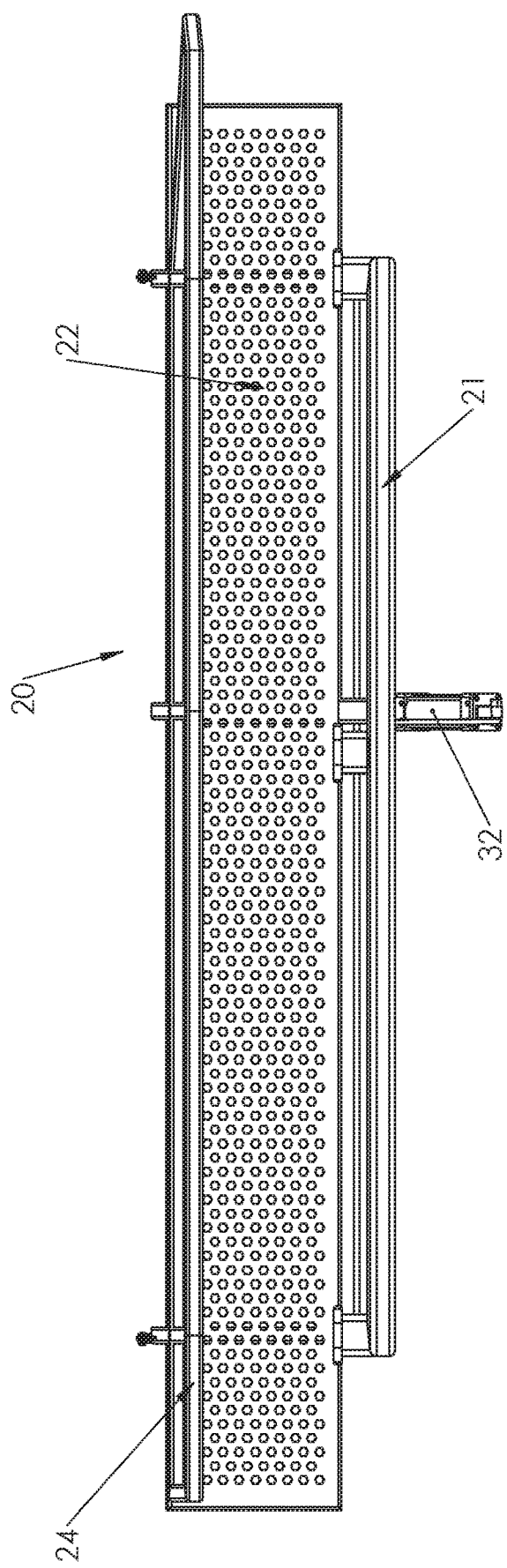
FIG. 4 is a top view of the embodiment of FIG. 2, which is still in the deployed condition.
Figure 10:
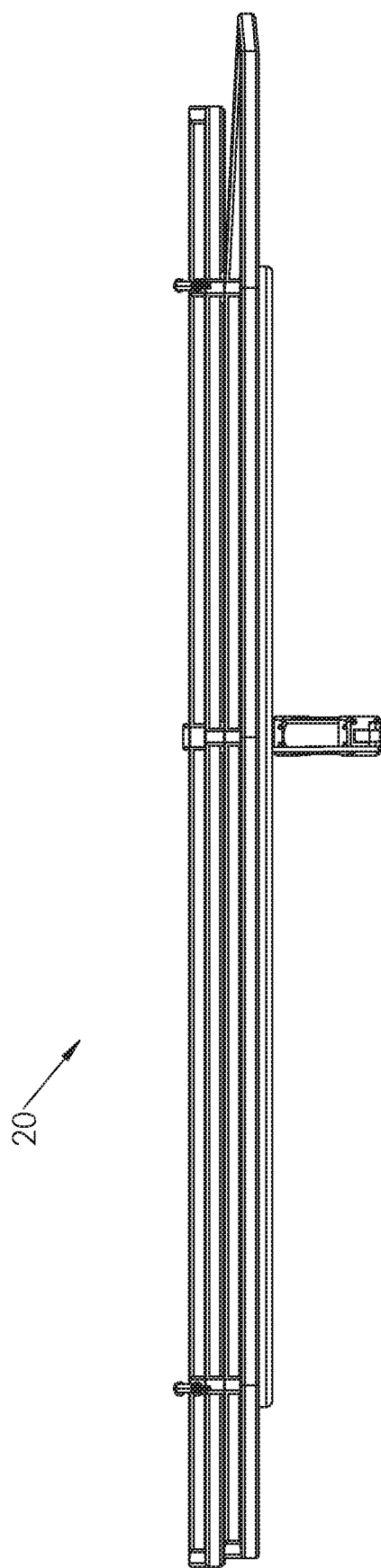
FIG. 10 is a top view of the catwalk of FIG. 2, when in the fully-retracted position of FIGS. 8 and 9.

FIGS. 2-9 portray an alternative catwalk 20 that is longer from front to rear compared to catwalk 10 of FIG. 1, but otherwise is similar in function and operation compared to catwalk 10. FIG. 2 (with detail FIG. 3) and FIG. 4 illustrate a left-side perspective view and a top view of the deployed catwalk, respectively. FIGS. 5-8, which are end views, show to best advantage the pivotal connections between the frame 21 and the floor 22, between the railing 14 and the floor 22, and between the three portions 41, 42, and 43 of the guide arm system 26. FIGS. 5-8 also show to best advantage the relationships and movement of these structures, as the catwalk 20 moves from the deployed position (FIG. 5) toward (FIGS. 6 and 7) and then into (FIG. 8) the retracted position. One may see that the piston rod 35 of the cylinder is fully-retracted/shortened in FIG. 5, partially-extended in a "half-stroke" position in FIGS. 6 and 7, and then fully-extended in a "full-stroke" position in FIG. 8. Thus, as discussed above in the Summary, supply of pressure to the cylinder, and consequent extension of the piston rod, is required to retract the catwalk 20. In the deployed position of FIG. 5, the floor 22 is horizontal or generally horizontal, and the railing 24 is vertical or generally vertical. In the "half stroke" position of FIGS. 6 and 7, the floor 22 is about 45 degrees from horizontal and the railing 24 is still vertical or generally vertical. In the "full-stroke" position of FIG. 8, the floor 22 and the railing 24 are both vertical or generally vertical, and are preferably parallel to each other and co-planar. The end view of FIG. 8, the side perspective view of FIG. 9, and the top view of FIG. 10 illustrate the compact, vertical configuration and the thin/small footprint of the retracted catwalk 20. "Generally vertical" and "generally horizontal" mean within 10 degrees of vertical and horizontal, respectively.

The mounting frame 21 of catwalk 20 preferably extends along most of the length of the catwalk, for example, along 70-100 percent of the length of the catwalk. This way, the frame 21 may provide an inner hand-railing along most of the catwalk, and/or may provide multiple, longitudinally-spaced pivotal mounting points for the floor 22 and longitudinally-spaced mounting points for multiple guide arm systems 26. The mounting frame 21 is preferably elongated and rectangular or generally rectangular, to provide said inner hand-rail and to provide said longitudinally-spaced mounting points, but it may be shaped otherwise in certain embodiments. The floor 22, is pivotally connected to the mounting frame 21 at hinge(s) 23. The railing 24 is pivotally connected to the floor 22 at hinge(s) 25. FIGS. 5 and 7 illustrate to best advantage end views of one hinge 23 and one hinge 25.

The actuator system 30 comprises a hydraulic or pneumatic cylinder 32 having a cylinder housing pivotally mounted at a first end connection 33 to a rigid, fixed bar/bracket member 34 that is fixed to, and does not pivot or move relative to, the mounting frame 21. The piston rod 35 of the cylinder 32 is pivotally connected at second end connection 36 to the inner edge 37 of the floor 22. Therefore, extension of the piston rod 35 from the cylinder will force the floor 22 to pivot (at 23) clockwise in FIGS. 5-7, moving the inner edge 37 of the floor downward and the outer edge 38 of the floor upward.

As retraction of the catwalk continues by extension of the piston rod 35, the floor 22 moves toward and into a vertical orientation, and the railing 24 pivots relative to the floor 22 also toward and into a vertical orientation. By the time of full retraction (full piston rod extension), the floor 22 and railing 24 are generally or entirely coplanar with each other and parallel to the vertical mounting frame 21, as shown to best advantage in FIG. 8. "Generally coplanar" means within 10 degrees of being coplanar.

The frame 21 is rigid and is typically installed and secured to beam(s), brace(s), chassis component(s), or other rigid and strong member(s) on the vehicle/equipment that are not part of the moving equipment of, or on, the vehicle/equipment. Said installation and securement may be done by bolts, welding, or other fastenings means, in order to place the frame 21 in a vertical or generally vertical orientation on the side of the vehicle or equipment, for example, with the catwalk floor, railing, and actuator already fixed to the frame 21. This way, the frame 21 and the other catwalk components may be installed as a single unit by "hanging" the frame 21 on the vehicle/equipment. This way, in the retracted position, both the catwalk floor and railing are compactly placed against the side of the frame 21, which is itself compact and narrow-in-width. Thus, the frame and the catwalk fill minimum horizontal space, when installed and collapsed against the side of the vehicle, for travel on public roads and for compact storage of the vehicle when not in use. See FIGS. 8-10. For example, the catwalk, when installed and collapsed against the right or left side of the vehicle in the retracted configuration/position, may add no more than one foot, and more preferably no more than 9 inches, to the total width of the vehicle/equipment. For example, two catwalks, when installed and collapsed against the right and left side of the vehicle in the retracted configuration/position, may add no more than two feet, and more preferably no more than 18 inches, to the total width of the vehicle/equipment. For example, a catwalk, when installed and collapsed against the rear or front side of the vehicle in the retracted configuration/position, may add no more than one foot, and more preferably no more than 9 inches, to the total length of the vehicle/equipment. For example, two catwalks, when installed and collapsed against the rear and front side of the vehicle in the retracted configuration/position, may add no more than two feet, and more preferably no more than 18 inches, to the total length of the vehicle/equipment.

Referring to the catwalk embodiments 10, 20 of FIGS. 1-10, the guide arm system 16, 26 is used to guide/control movement of the railing 14, 24 relative to the floor 12, 22 and hence relative to the mounting frame 11, 21 and the vehicle/equipment on which the frame 21 and catwalk 10, 20 are mounted. Referring especially to the catwalk 20 of FIGS. 2 and 5-8, guide arm system 26 comprises multiple portions, that is, a guide arm inner end 41, an outer end 42, and a middle arm 43. Guard arm inner end 41 is rigid and rigidly-fixed to the mounting frame 21 so that the inner end 41 does not pivot or move relative to the frame 21. The guide arm outer end 42 is rigid and its inner surface 46 is rigidly-fixed to the railing 24, at the lower outer surface 44 of the rigid railing 24. This way, the outer end 42 does not pivot, slide, or otherwise move relative to said lower outer surface 44 or relative to any portion of the railing 24. Between said inner end 41 and outer end 42, the guide arm comprises a rigid middle arm 43 pivotally connected at pivotal connections 48 and 49, to the inner end 41 and outer end 42, respectively.

The entire guide arm 26 (41, 42, 43 collectively guide arm/system 26) may be described as outside of the walkway W of the catwalk 20, because it is located below and/or out from the outer surfaces of the railing 24 and the floor 22, that is, below and/or toward the left on the drawing sheets relative the floor and railing in FIGS. 5-8. None of the guide arm system 26 is fastened directly to or contacting the floor 22, and the middle arm 43 does not fasten directly to, or contact any of, the mounting frame 21, floor 22, or railing 24. The floor 22 is moveable relative to the guide arm 26.

Figure 8:
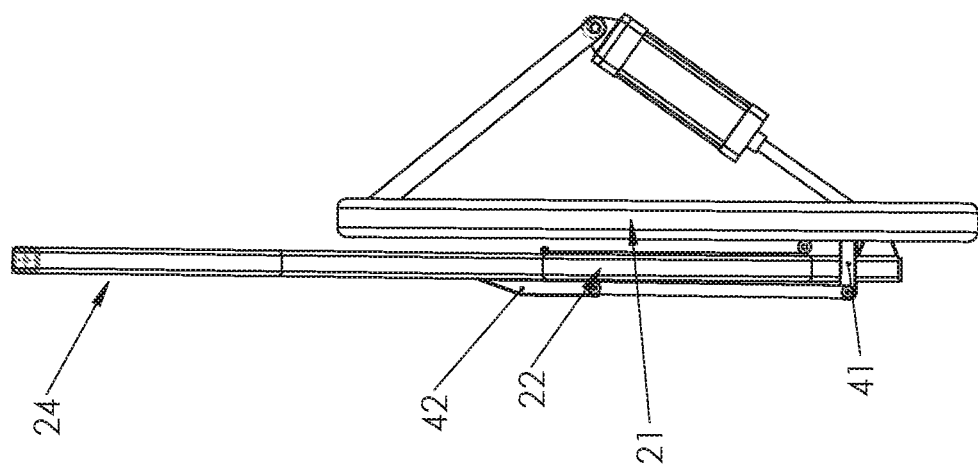
FIG. 8 is a rear end view of the catwalk of FIG. 2 in a fully-retracted position.
Figure 9:
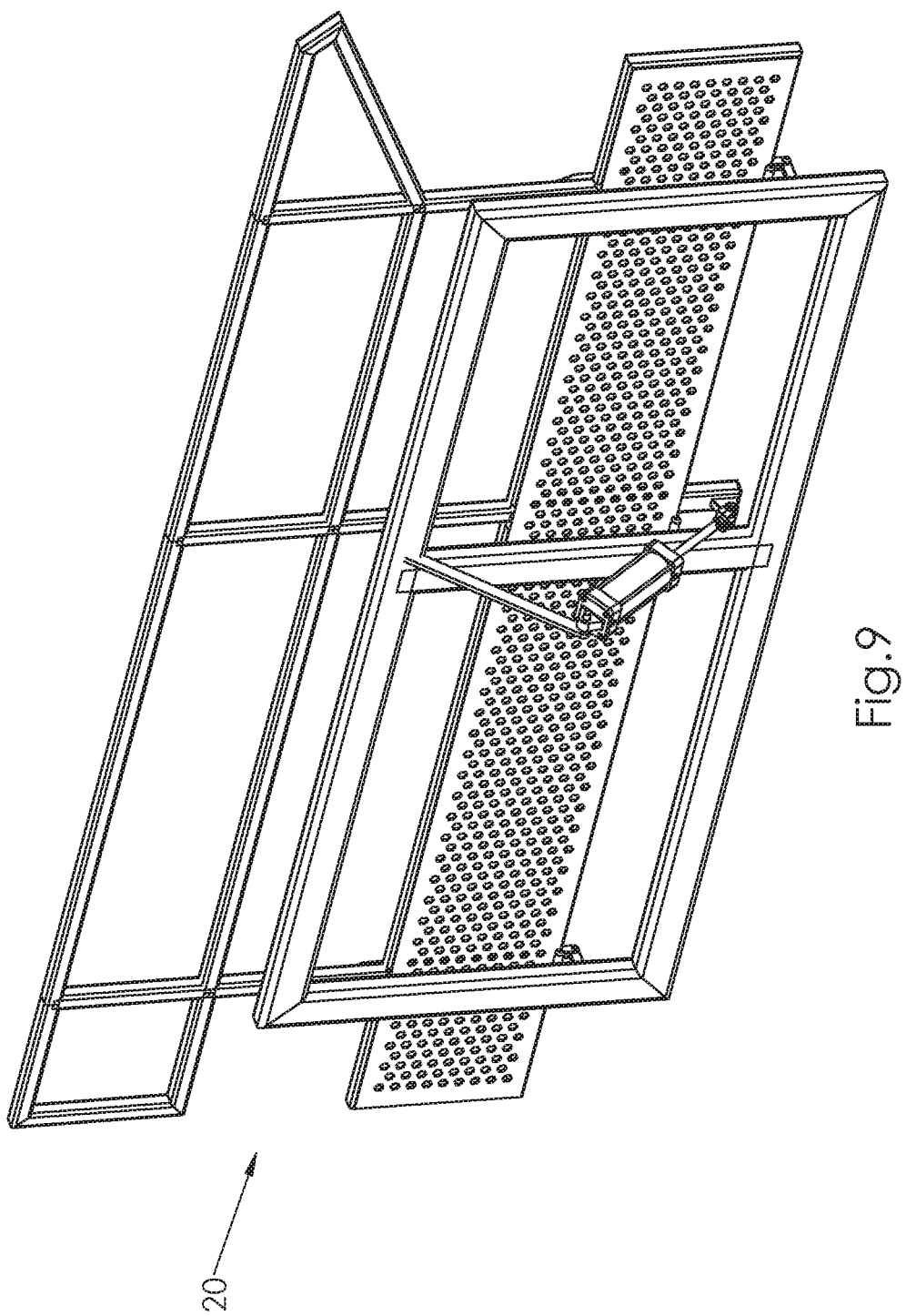
FIG. 9 is a right-side perspective view of the catwalk of FIG. 2, in the fully-retracted position.

By viewing the transition from FIG. 5, to FIGS. 6 and 7, and finally to FIG. 8, it will be understood that the guide arm system 26, by means of its structure, placement and geometry, continues to guide/control the railing 24 relative to the floor 22, and therefore relative to the frame 21 and vehicle/equipment, throughout the retraction process, throughout the deployment process that is the reverse process of FIGS. 5-8, and while the catwalk is stationary in the retracted position and the deployed position. The preferred guide arm system does not power retraction or deployment, but guides/controls the railing 24 orientation during retraction and deployment that are both powered by the actuator system 30. For example, the relative lengths of each of inner end 41, outer end 42, and middle arm 43, and the relative location of the pivot axis (25) of the railing 24 relative to the floor 22, and the pivot axis (49) of the outer end 42 relative to the middle arm 43, the guide arm 26, serve to control the movement of the railing 24 relative to the floor 22. To illustrate this, see the catwalk element positions and relationship in FIG. 5, as follows. When the cylinder 32 is fully shortened (piston rod 35 fully retracted), the floor 22 will be generally horizontal and will pivot no further than its position in FIG. 5. The railing 24 is generally perpendicular to the floor 22, with the floor 22 and pivot 25 spaced from the middle arm 43 and pivot 49, respectively. The inner end 41 and middle arm 43 are parallel to each other and horizontal. The outer end 42 is perpendicular or generally perpendicular to the middle arm 43. Thus, in the position in FIG. 5, given that the floor 22 is retained in its position by the cylinder piston rod 35 and that the railing 24 is fixed to the outer end 42, one may see that the railing 24 cannot continue to pivot in either a counter-clockwise or clockwise direction. "Generally horizontal" and "generally perpendicular" mean within 10 degrees of horizontal and perpendicular, respectively.

Further illustrating the preferred structure and function of the guide arm system, it may be noted that, if the outer end 42 where slidable relative to the outer surface 44 of the railing (instead of being fixed to the railing), the railing could continue to pivot in either direction (counterclockwise or clockwise) independently of the outer end 42. Furthermore, in this scenario, the outer end 42 could also pivot independently of the railing because the inner surface 46 of the outer end 42 and the outer surface 44 of the railing 24 could move/slide relative to each other during that continued independent pivoting.

The actuator system is adapted to enhance safety. The hydraulic and/or pneumatic cylinder(s) is/are in a retracted condition when the catwalk is deployed. Therefore, the cylinder(s) must extend/lengthen in order to retract the catwalk and the preferred actuator system is designed/tuned to ensure that the catwalk does not retract and trap a user on the catwalk. The lift capacity of the cylinder is controlled/tuned so that the cylinder does not have the capacity/capability to retract the catwalk when occupied. For example, the lift capacity of the hydraulic cylinder is controlled by the pressure of the hydraulic fluid applied to the cylinder. The pressure of the preferred catwalk actuator system is pre-set by tuning the hydraulic valve that supplies the cylinder so that it has enough applied pressure to operate the cylinder and lift the catwalk but not enough to overcome the added weight of a person on the catwalk. Said tuning can be done to account for the minimum expected adult worker's weight, for example, an additional 90 pounds. This safety feature is therefore accomplished automatically after the cylinder has been tuned before or during installation of the catwalk, so that accidental actuation of the cylinder will not cause the catwalk to retract. This safety feature is therefore provided without complex controls, safety switches, or locks that must be remembered and properly operated by personnel. The chance of improper use, damage, or tampering with this safety feature is very small or non-existent.

FIGS. 11-18 illustrate catwalk embodiments 200, 300, 400 according to the invention that are mounted on the right side, left side, and rear side of a cable reel truck 100. This way, user(s) may safely work on any or all three catwalks and may walk easily between the catwalks. The catwalks 200, 300, and/or 400 of FIGS. 11-18 may have many or all of the elements, functions, and benefits described above regarding the embodiments of FIGS. 1-10, even though an alternative means for connecting the catwalks to the vehicle/equipment is used, that is, direct connection to rigid and strong member(s) of the vehicle/equipment. Also, the three catwalks 200, 300, 400 may all share similar or the same elements, functions, and benefits, so that certain embodiments may be interchangeably installed on various sides/locations of the vehicle/equipment. The main differences between embodiments 200, 300, 400 may be: a) different lengths, for example, left- and right-mounted embodiments being longer than front- or rear-mounted embodiments, and/or b) railings modified in shape, for example, to include an extension such as the generally triangular extension shown to best advantage in FIGS. 1, 2, 9, and 18.

Instead of the catwalk comprising a frame that is secured to the vehicle/equipment ("indirect connection" to the vehicle/equipment), the catwalks of FIGS. 11-18 are connected directly (or "attached directly") to beam(s), brace(s), chassis component(s), or other rigid and strong member(s) on the vehicle/equipment (hereafter called "rigid chassis member") that are not part of the moving equipment of the vehicle or on the bad/platform. This is done by pivotally connecting the portions of the catwalk that are shown and described above as being connected to frame 11, 21 or the fixed bar/bracket member 34 of the frame, instead, to the rigid chassis member(s). Specifically, the top (housing) end of the actuator cylinder(s), the floor, and the guide arm(s) are each pivotally connected to one or more rigid chassis members, in other words, to portions of the vehicle/equipment frame/chassis instead of to a mounting frame 11, 21 that is added to the vehicle/equipment. One may understand that this direct-connection option may be workable in many embodiments, but that using an intermediate frame 11, 21 with bar/bracket member 34 may increase the ease and vehicle-to-vehicle consistency of retrofitting an existing vehicle with one or more catwalks.

Figure 11:
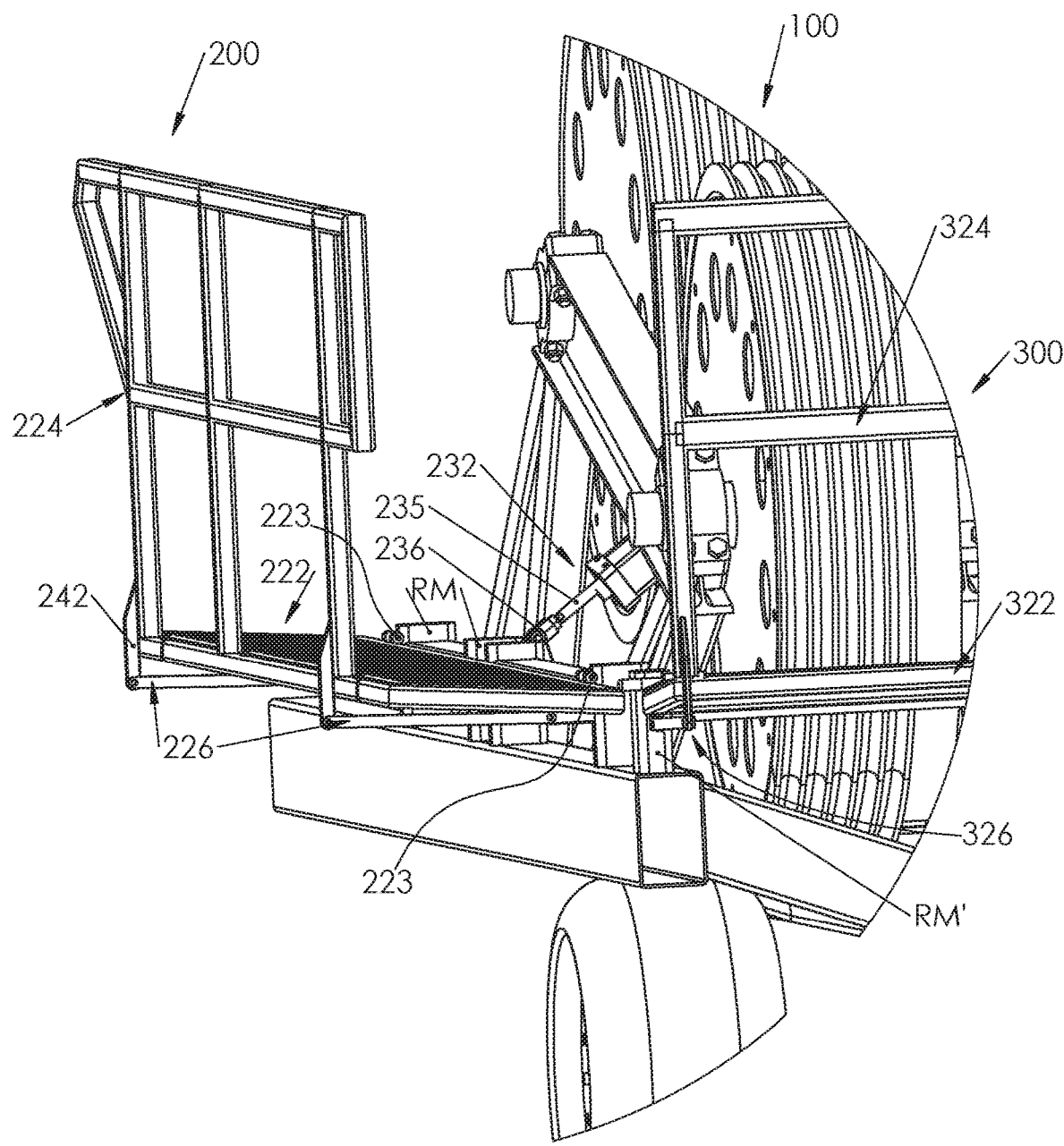
FIGS. 11-18 illustrate certain embodiments of the invented catwalk connected to an exemplary vehicle for use, specifically, a cable reel truck.
Figure 12:
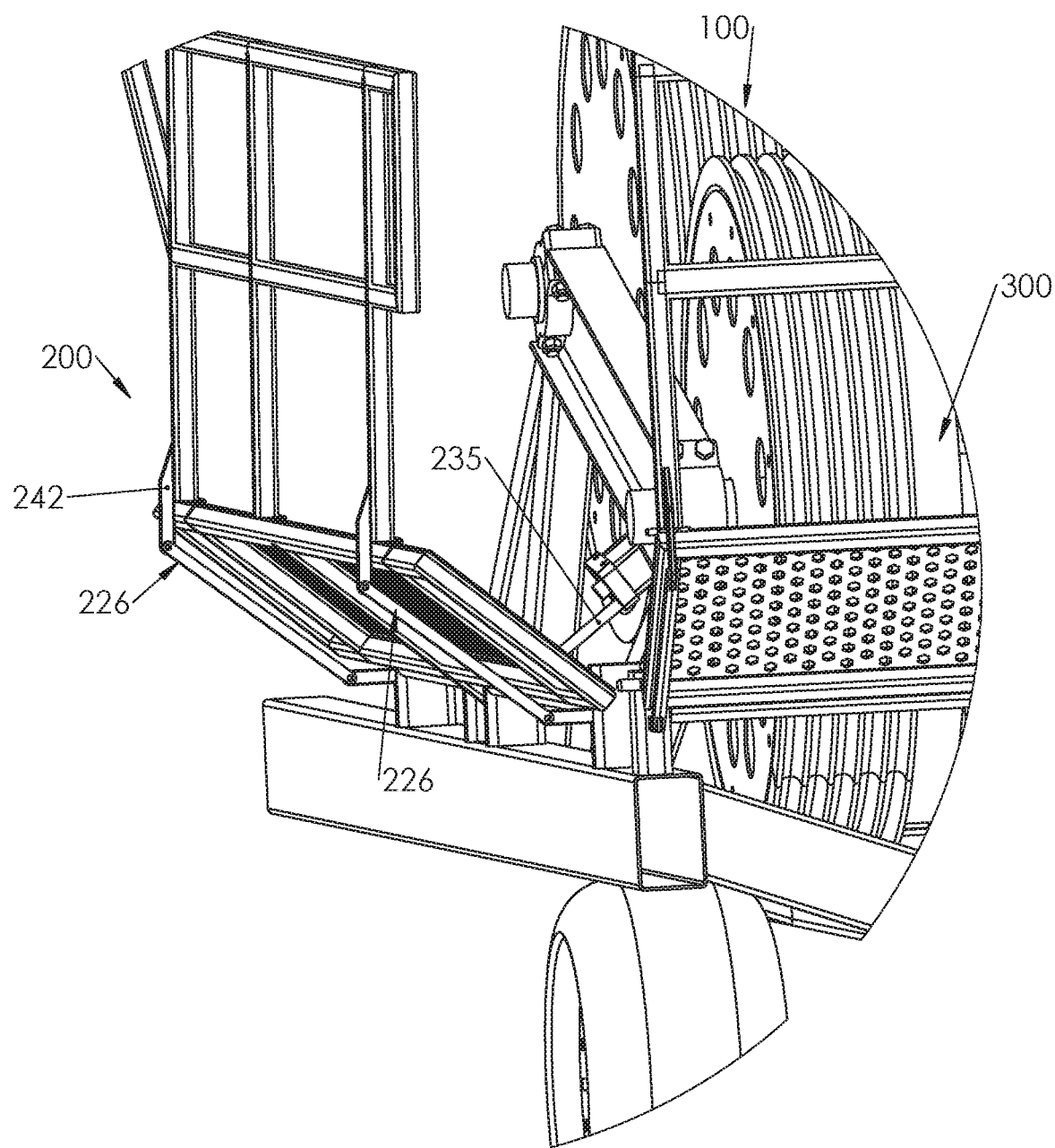
Figure 13:
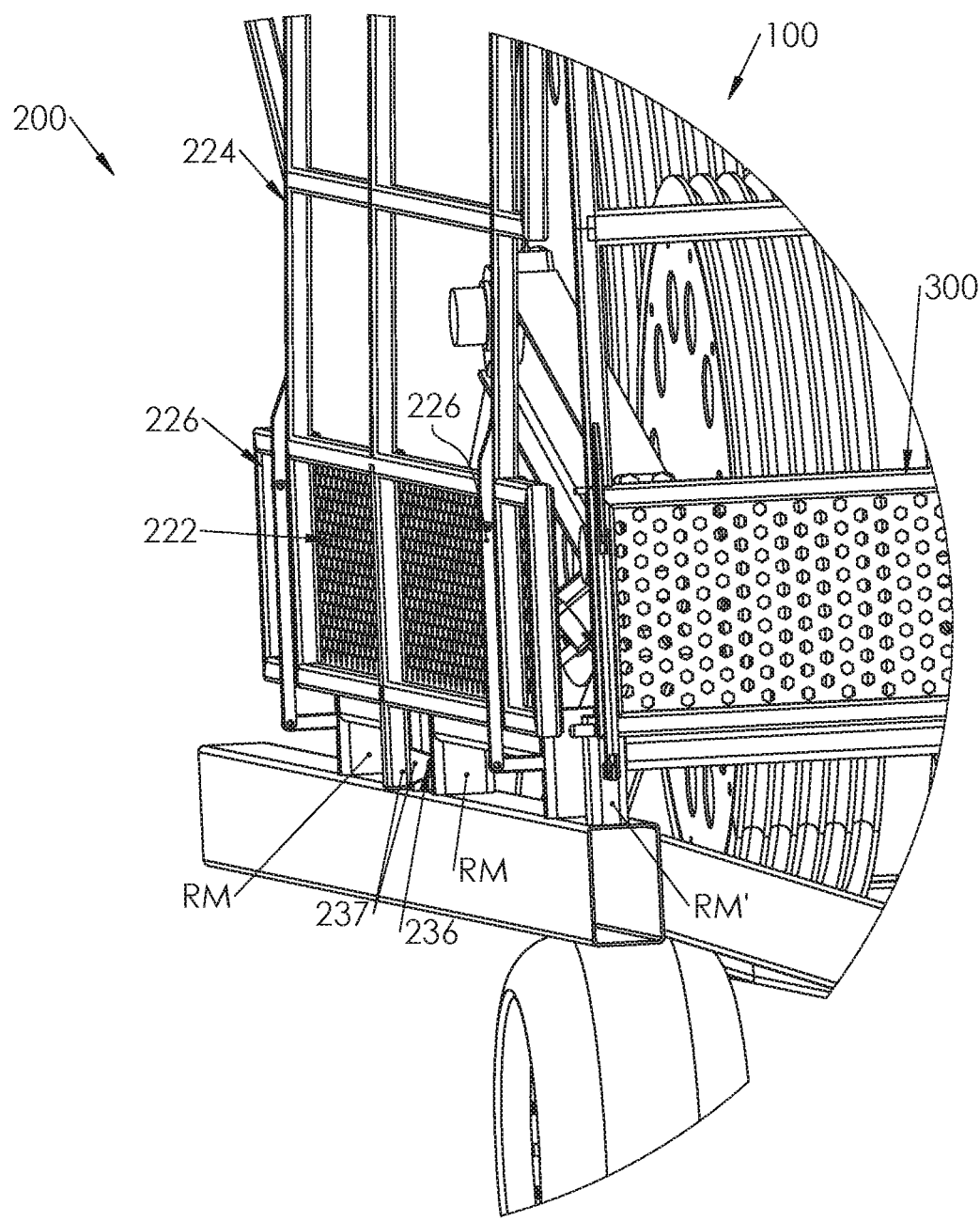
Figure 14:
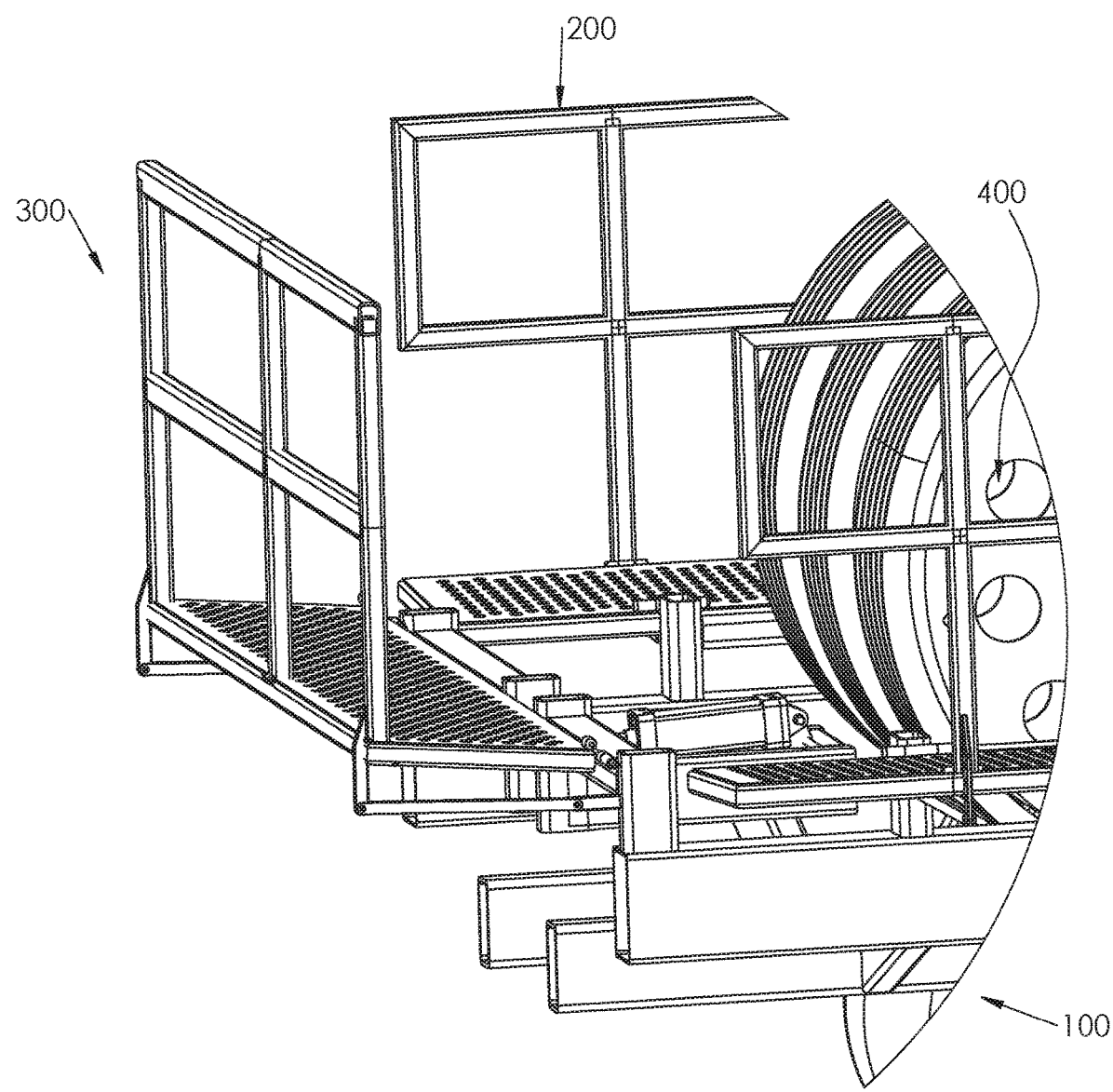
Figure 15:
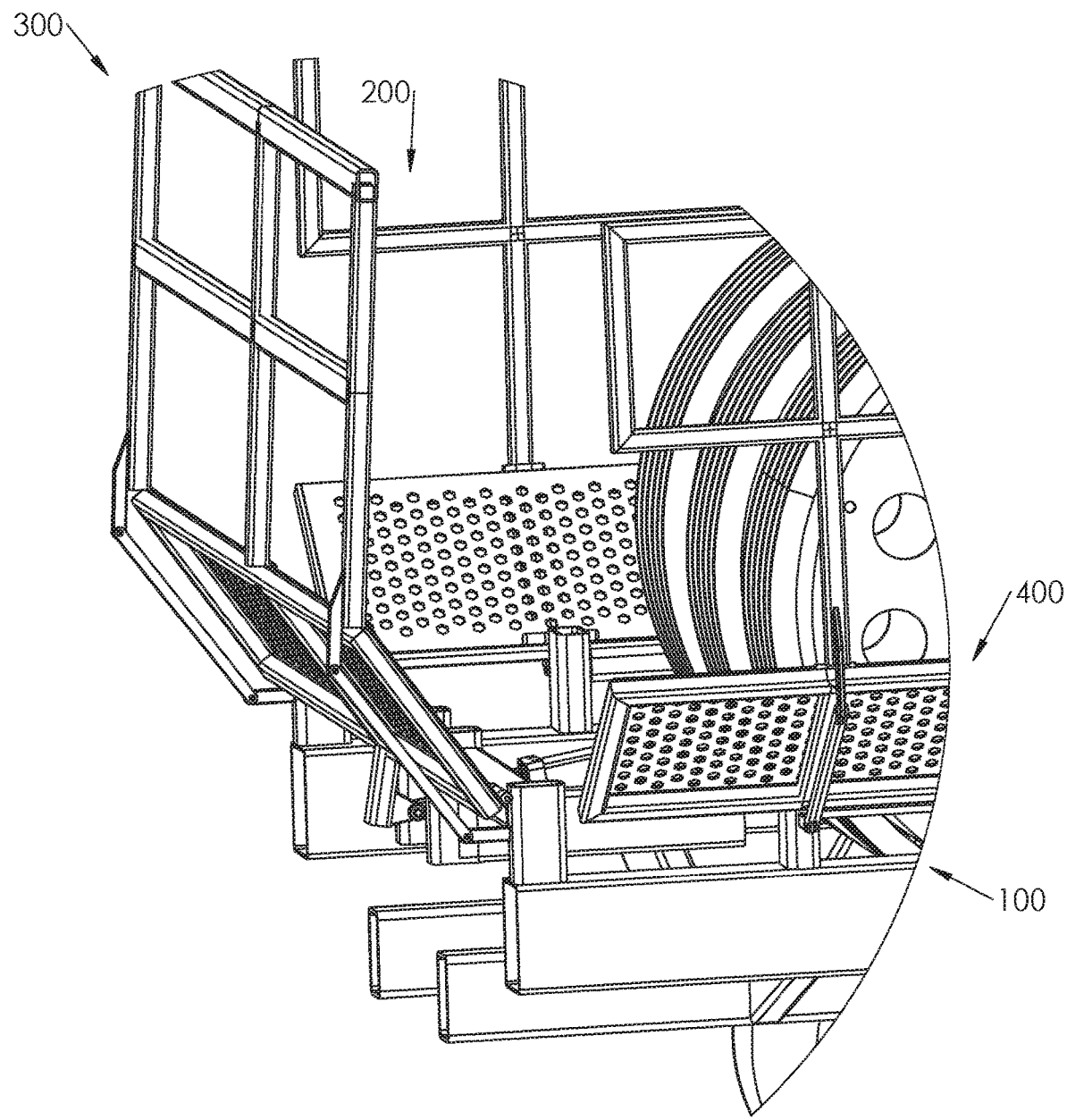
Figure 16:
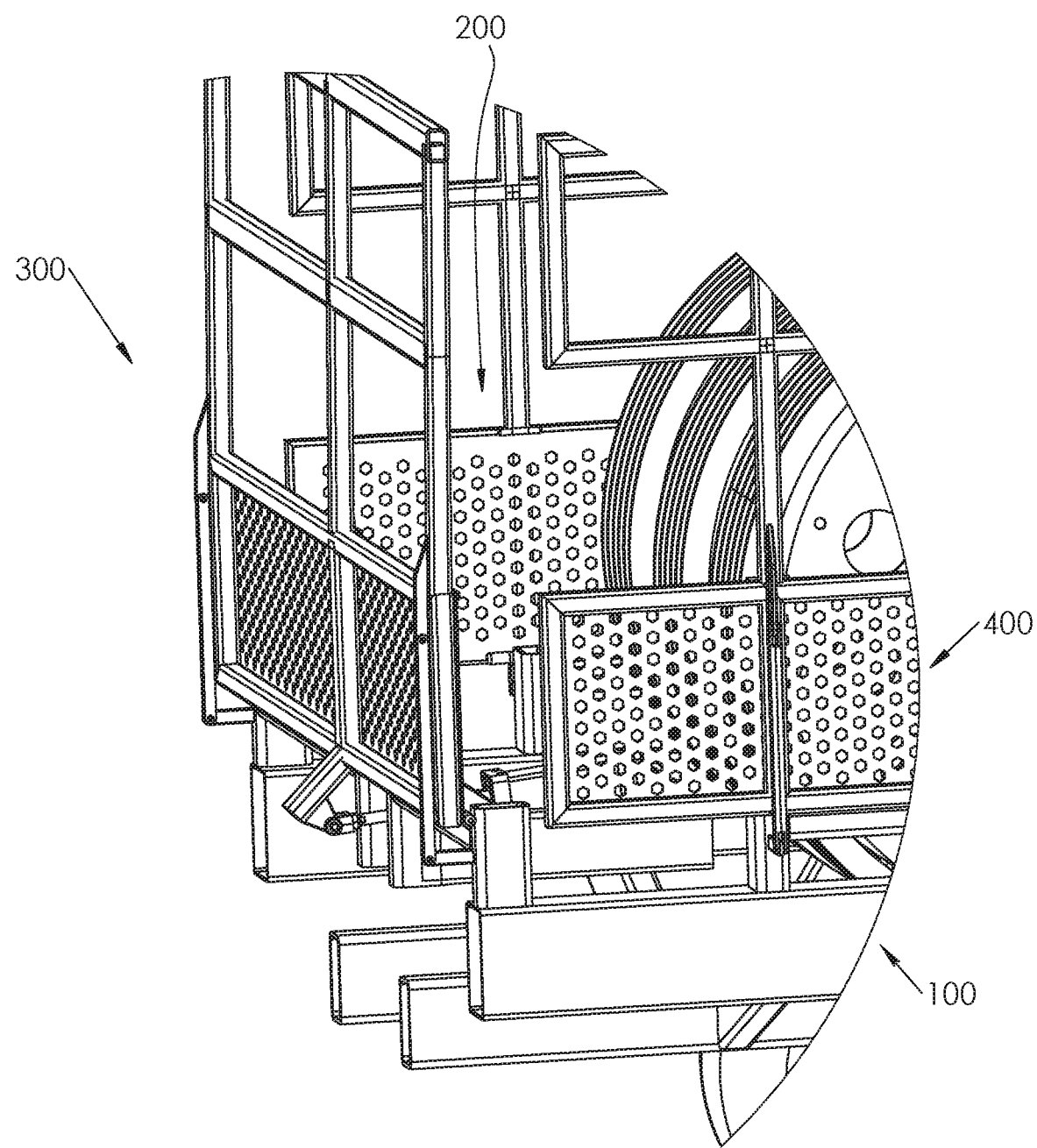
Figure 17:
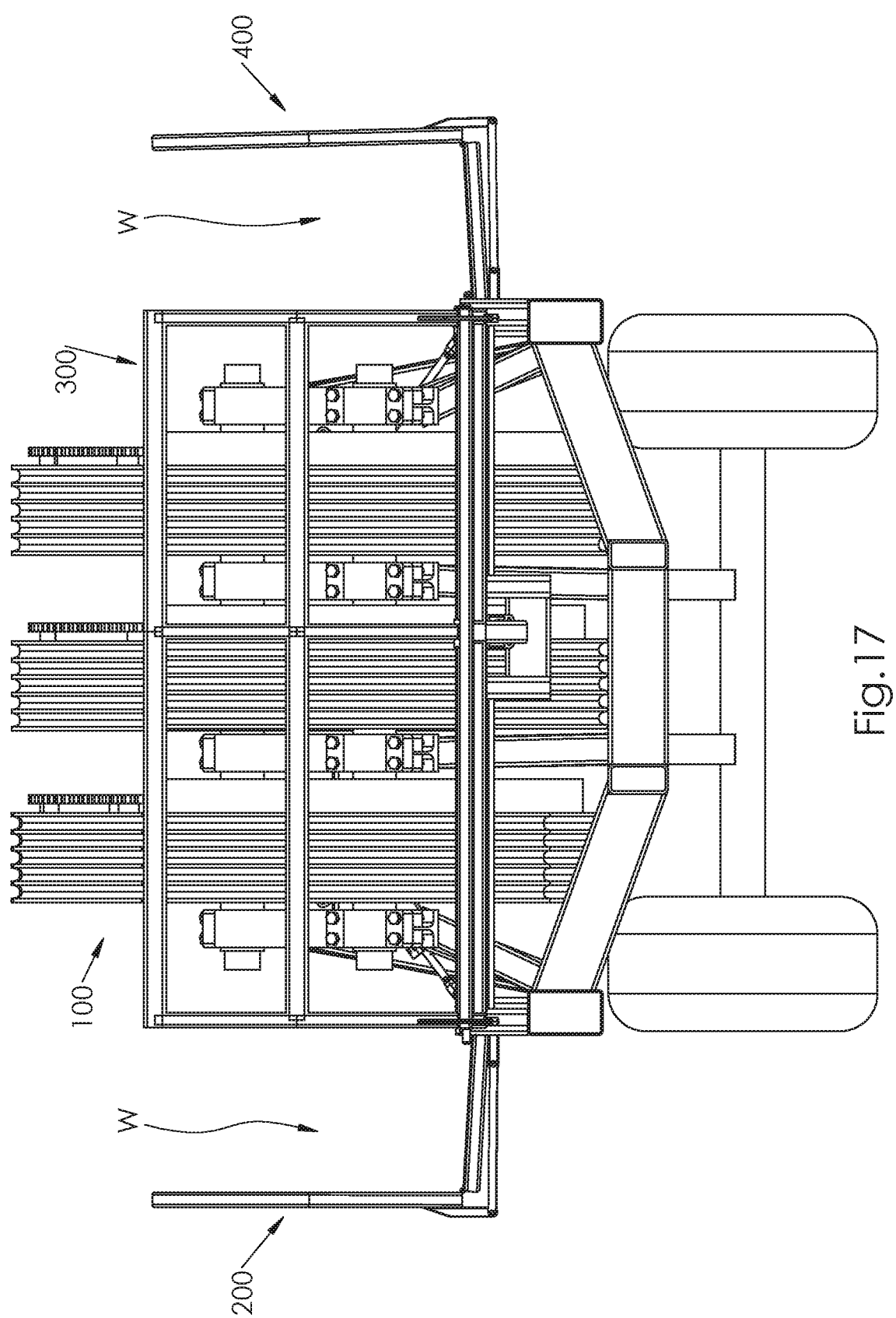
Figure 18:
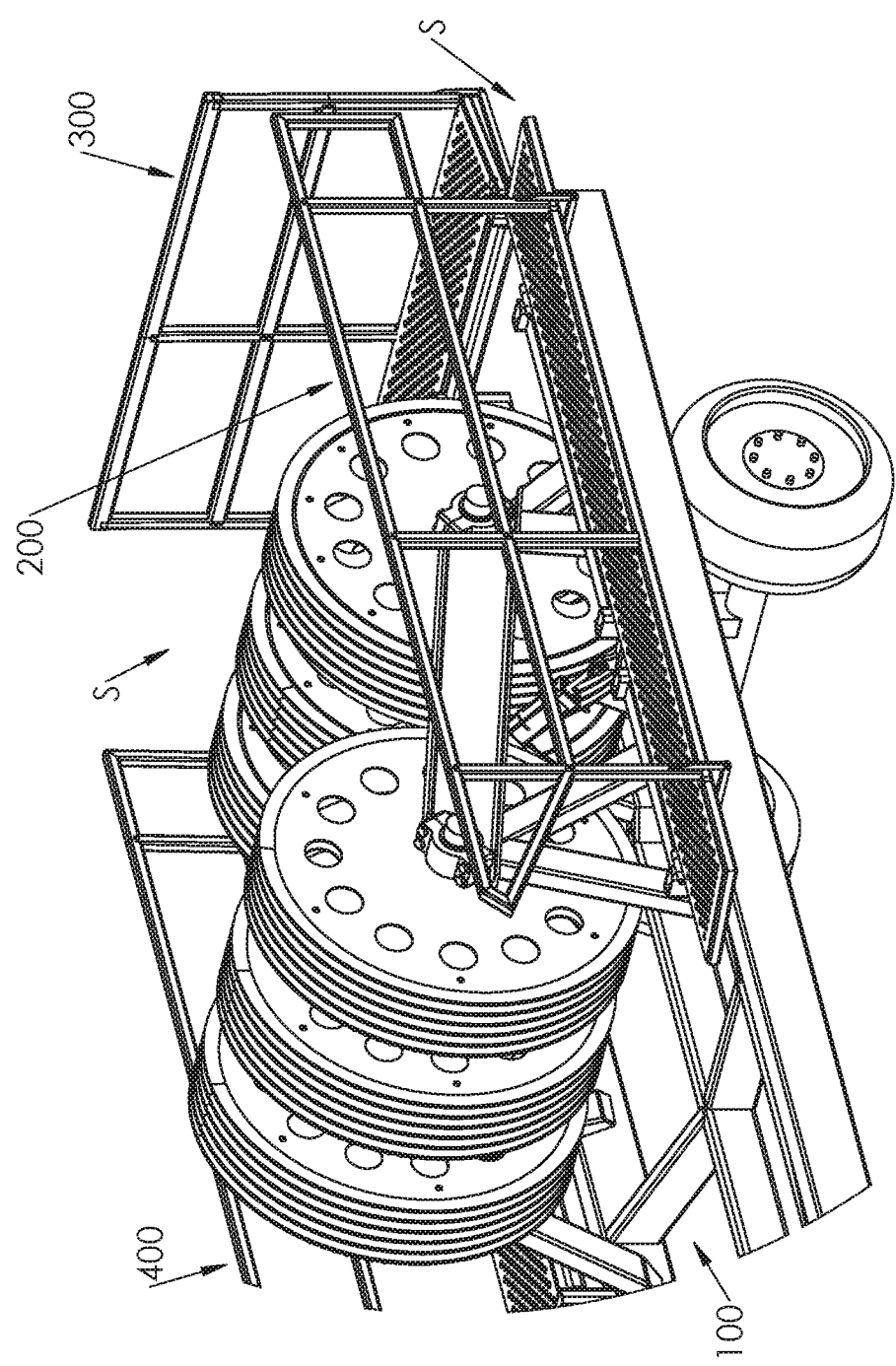

A catwalk 200 is mounted on the left side of a cable reel truck 100, and is shown in deployed position in FIG. 11, partially retracted or "half-stroke" position in FIG. 12, and retracted position in FIG. 13. The cylinder 232 is installed on the vehicle 100 by pivotally connecting the top end of the cylinder housing to a rigid chassis member (not visible in FIGS. 11-13), and pivotally connecting the second end of the piston 235, via second end connection 236, to the inner edge 237 of the floor 222. Inner edge 237, visible in FIG. 13, is an extension bar/member extending from the main body of the floor 222 that fits and pivots in between multiple rigid chassis members RM. The main body of the floor 222 is pivotally connected to rigid chassis members RM at hinges 223, as best seen in FIG. 11.

As discussed above for catwalks 10 and 20, the railing 224 pivots relative to the floor 222, and is guided/controlled by guide arm system 226, which is structured and operates similarly or the same as guide arm system 26, as will be understood by one of skill in the art after reading this document and viewing the figures. Similarly as discussed above, the railing 224 remains perpendicular or generally perpendicular to the floor 222 in the deployed position (FIG. 11), due to the structure, placement, and geometry of the guide arm system 226 and the fixed connection of its outer end 242 to the railing 224. During retraction, again due to said structure, placement, and geometry, the railing 224 is then guided/controlled by said guide arm and its outer end 242, into the fully retracted position shown in FIG. 13, where the railing 224 is vertical or generally vertical, and parallel or generally parallel to, and preferably co-planar or generally co-planar to, the main plane of the floor 222. "Generally perpendicular", "generally vertical", "generally parallel" and "generally co-planar" mean within 10 degrees of perpendicular, vertical, parallel, and co-planar, respectively.

A catwalk 300 is mounted on the rear side of the cable reel truck 100, and, like catwalk 200, is shown in deployed position in FIG. 11, partially retracted or "half-stroke" position in FIG. 12, and retracted position in FIG. 13. Like catwalk 200, catwalk 300 has a floor pivotally connected to rigid chassis members RM', and a guide arm system 326 for guiding and controlling the pivoting and position of the railing 324 relative to the floor 322. The cylinder, piston, and connections of the actuator system of catwalk 300 are not visible in FIGS. 11-13, but will be understood to preferably be similar or the same as those discussed above.

FIGS. 14-18 show an embodiment wherein three catwalks are provided on the cable reel truck 100. In addition to catwalks 200 and 300 being installed on the reel truck 100, catwalk 400 is installed on the right side of the reel truck 100. Catwalk 400 may be structured and may function similarly to the other catwalks, and preferably is a mirror image of catwalk 200. This way, one or more users can access and work on three sides of the reels or other equipment on the truck 100, by walking along each catwalk and stepping from catwalk to catwalk over the relatively small spaces S between the right and left catwalks and the rear catwalk. While the three-catwalk system shown in FIGS. 14-18, or a four-catwalk system for all four sides of vehicle/equipment, may be particularly beneficial for excellent access to the vehicle bed and equipment, one may understand that one catwalk, or multiple catwalks on any combination of sides, may significantly improve access and safety. By providing at least one of a left- or right-side catwalk, plus at least one of a rear-side or a front-side catwalk, walkways W are provided for convenient movement along the entire or substantially the entire length and width of the vehicle/equipment.

Therefore, the preferred catwalks and their actuator system and guide arm systems are specially-adapted to provide sleek design and effective operation that can be applied to many different vehicles and pieces of equipment where the user needs to be safely elevated alongside the vehicle/equipment. The hydraulic or pneumatic cylinder(s) and associated connections and apparatus of the actuator system are provided substantially or entirely outside of the walkway space W. Furthermore, the guide arm system is also provided substantially or entirely outside of the walkway. For example, the guide arm system may be provided below the floor and out away from the outer surface of the railing. Thus, preferably no portion of the actuator system or guide arm system protrudes into, or obstructs, the walkway W or the walkway open ends. For example, there are no bars or protrusions that the user must walk over or around when moving from one end of the walkway to another. For example, there are preferably no obstructions or protrusions such as bars, chains, link members or other barriers protruding into or extending across the open ends of the catwalk walkway. Further, the catwalks preferably are arranged and sized so that at least one end of each catwalk is near (for example, within 3 feet or less of) the end of another catwalk, so a user can step just a few feet (the length or less than the length of a typical worker's stride) over the spaces S between the catwalks, and thus walk along multiple or all the catwalks without climbing down from a catwalk to climb up onto another.

Further, these above benefits are accomplished by the preferred catwalk without the retracted catwalk affecting, or, at most only very minimally affecting, the outside dimensions, and hence the normal footprint, of the vehicle/equipment on which the catwalk is installed. Thus, a vehicle built to satisfy size regulations should not be adversely affected by the addition/retrofit of the catwalk(s) onto the vehicle.

One may understand from the drawings and this document that, depending on the length of the catwalk and the location/structure available for attachment of the frame 11, 21 or for the direct attachment to rigid chassis members RM, RM', multiple actuation systems, cylinders, pivotal hinges/connections, and/or guide arms, spaced along the length of the catwalk, may be used to strengthen, stabilize, and/or effectively operate each catwalk and/or to effectively connect the catwalk to the vehicle/equipment.

Certain embodiments may be described as comprising, consisting essentially of, or consisting of: a catwalk having an inner side for connection to a side of a vehicle/equipment and an outer side facing away from the side of the vehicle/equipment, the catwalk comprising: a floor that is pivotal relative to the vehicle/equipment, a railing that is pivotally connected to the floor, an actuator system that moves the floor and the railing from a deployed position wherein the floor is generally horizontal (0-10 degrees from horizontal, or "within 10 degrees of horizontal") and the railing is generally vertical (0-10 degrees from vertical or "within 10 degrees of vertical") to a retracted position wherein both the floor and railing are generally vertical (0-10 degrees from vertical or "within 10 degrees of vertical") and close to the side of the vehicle/equipment with the railing above the floor, and a guide arm adapted to maintain the railing generally perpendicular (0-10 degrees from perpendicular or "within 10 degrees of perpendicular" or "at 80-100 degrees from each other") to the floor in the deployed position and generally parallel (0-10 from each other or "within 10 degrees of each other") to the floor the retracted position. The railing and the floor in the retracted position may be vertical and co-planar. In the deployed position, the floor may have a bottom side and the railing may have an outer side facing away from the vehicle/equipment, and the guide arm extends along said bottom side of the floor and up along said outer side of the railing. The actuator system may comprise a hydraulic or pneumatic cylinder that has an upper, inner end near said inner side for pivotal connection to the vehicle/equipment, and a lower, outer end that is pivotally connected to an inner edge of the floor, wherein extension of the cylinder pivots the floor from the deployed position to the retracted position. For safety purposes in certain embodiments, a maximum pressure may be supplied to the cylinder that is sufficient to retract the catwalk only if a person is not on the catwalk. For example, a maximum pressure may be supplied to the cylinder that is sufficient to retract the catwalk plus a weight on the floor of the catwalk of no more than 90 pounds. In certain embodiments, the guide arm has an inner end for connection to the side of the vehicle/equipment, a middle arm, and an outer end fixed and immovable relative to the railing, wherein none of the guide arm is attached to the floor and/or none of the guide arm contacts the floor. Said middle arm may be pivotally connected to the inner end of the guide arm, and the outer end of the guide arm may be pivotally connected to the middle arm.

In certain indirect connection embodiments of the catwalk in the paragraph immediately above, the catwalk further comprises a frame at an inner side of the catwalk for connection to the vehicle/equipment, wherein an inner edge of the floor, an inner end of the guide arm, and a top end of the actuator system, are connected to said frame. In certain of these indirect connection embodiments, the frame, and the floor and the railing in the deployed position, define a walkway above the floor between the frame and the railing, and no portion of the actuator system extends into the walkway, and no portion of the guide arm extends into the walkway. In certain direct connection embodiments of the catwalk that is described in the paragraph immediately above, the catwalk is connected to the side of the vehicle/equipment by direct connection of the floor, guide arm, and actuator system, to rigid chassis members of the vehicle/equipment. In certain direct connection embodiments, the side of the vehicle/equipment, and the floor and the railing in the deployed position, may define a walkway above the floor between the side of the vehicle-equipment and the railing, wherein no portion of the actuator system extends into the walkway, and no portion of the guide arm extends into the walkway. In certain of these direct connection embodiments, the actuator system extends outward only as far as an inner edge of the floor, and no portion of the guide arm extends above the floor.

A catwalk system may comprise a plurality of catwalks to the two paragraphs immediately above. The system may comprise a first catwalk and a second catwalk, wherein the first catwalk is for connection to a right or left side of the vehicle/equipment, the second catwalk is for connection to a rear side or front side of the vehicle/equipment, wherein the floor of the first catwalk has a length and the floor of the second catwalk has a length that is perpendicular to the length of the first catwalk. The first catwalk may have an open end, and the second catwalk may have an open end near the open end of the first catwalk, for access between the first and second catwalks by a user stepping through the opens ends from the first catwalk floor to the second catwalk floor and from the second catwalk floor to the first catwalk floor. The railing and the floor of the first catwalk in the retracted position may be vertical and co-planar. The railing and the floor of the second catwalk in the retracted position may be vertical and co-planar. Preferably, for safety purposes, each of the first and second catwalks is adapted to not retract if a person is on the catwalk. The guide arm of the first catwalk may have an inner end for connection to the right or left side of the vehicle/equipment, a middle arm, and an outer end fixed and immovable relative to the railing of the first catwalk, wherein none of the guide arm of the first catwalk is attached to (and/or none of the guide arm contacts) the floor of the first catwalk. The guide arm of the second catwalk may have an inner end for connection to the rear side or front side of the vehicle/equipment, a middle arm, and an outer end fixed and immovable relative to the railing of the second catwalk, wherein none of the guide arm of the second catwalk is attached to (and/or none of the guide arm contacts) the floor of the second catwalk.

Certain embodiments may be described as a catwalk having an inner side for connection to a side of a vehicle/equipment and an outer side for facing away from the side of the vehicle/equipment, the catwalk comprising, consisting essentially of, or consisting of: a floor that is pivotal relative to the vehicle/equipment; a railing that is pivotally connected to the floor; an actuator system that moves catwalk between a retracted position for storage and travel and a deployed position for use; wherein, in the retracted position, both the floor and railing are close to the side of the vehicle/equipment with the railing above the floor; wherein, in the deployed position, the floor is pivoted down for use as a walkway and the railing upends at or near an outer edge of the floor; and wherein the catwalk further comprises a guide arm that controls pivoting of the railing relative to the floor in, and during movement between, the deployed position and the retracted position. The railing and the floor in the retracted position may be vertical and co-planar. The floor in the deployed position may be pivoted to within 10 degrees of horizontal. The floor in the deployed position has a bottom side and the railing in the deployed position has an outer side facing away from the vehicle/equipment, and the guide arm in deployed positon may extend along said bottom side of the floor and up along said outer side of the railing. The actuator system may comprise a hydraulic or pneumatic cylinder that has an upper, inner end near said inner side for pivotal connection to the vehicle/equipment, and a lower, outer end that is pivotally connected to an inner edge of the floor, wherein shortening of the cylinder pivots the floor from the retracted position to the deployed position, and lengthening of the cylinder pivots the floor from the deployed position to the retracted position. In certain embodiments, for safety purposes, a maximum pressure supplied to the cylinder may be only sufficient to retract the catwalk plus a weight on the floor of the catwalk of no more than 90 pounds.

In the Summary of the Invention, throughout the Detailed Description, and in the accompanying drawings, reference is made to particular features, including method steps, of certain embodiments of the invention. It is to be understood that the disclosure of the invention in this specification includes all possible combinations of such particular features. For example, where a particular feature is disclosed in the context of a particular aspect, a particular embodiment, or a particular Figure, that feature can also be used, to the extent appropriate, in the context of other particular aspects, embodiments, and Figures, and in the invention generally. Further, although this disclosed technology has been described above with reference to particular means, materials and embodiments, it is to be understood that the disclosed technology is not limited to these disclosed particulars and extends instead to all equivalents within the broad scope of this disclosure and of following claims.

The invention claimed is:

1. A catwalk having an inner side for connection to a side of a vehicle/equipment and an outer side facing away from the side of the vehicle/equipment, the catwalk comprising:
    a floor comprising a hinge for pivotal connection to the vehicle/equipment, a railing that is pivotally connected to the floor, an actuator system that moves the catwalk from a deployed position wherein the floor is generally horizontal and the railing is generally vertical, to a retracted position wherein both the floor and railing are generally vertical and close to the side of the vehicle/equipment with the railing entirely above the floor;
    wherein the actuator system is connected to an inner edge of the floor at an actuator connection that is inward relative to said hinge, and the actuator system pushes down said inner edge to pivot the floor on said hinge to move an outer edge of the floor upward from a deployed floor position to a retracted floor position; and
    the catwalk further comprising a guide arm adapted to maintain the railing generally perpendicular to the floor when the catwalk is in the deployed position, to control pivoting of the railing relative to the floor during the moving of the floor from the deployed floor position to the retracted floor position, and to maintain the railing entirely above the floor when the catwalk is in the retracted position.

2. The catwalk as in claim 1, wherein the railing and the floor in the retracted position are vertical and co-planar.

3. The catwalk as in claim 1, wherein, when the catwalk is in the deployed position, the floor has a bottom side and the railing has an outer side facing away from the vehicle/equipment, and the guide arm extends along said bottom side of the floor and up along said outer side of the railing.

4. The catwalk as in claim 1, wherein the actuator system comprises a hydraulic or pneumatic cylinder that has an upper, inner end near said inner side for pivotal connection to the vehicle/equipment, and a lower, outer end that is pivotally connected to said inner edge of the floor at said actuator connection, and wherein extension of the cylinder pivots the floor from the deployed floor position to the retracted floor position, and shortening of the cylinder pivots the floor from the retracted floor position to the deployed floor position.

5. The catwalk as in claim 4, wherein a maximum pressure is supplied to the cylinder that is sufficient to retract the catwalk only if a person is not on the catwalk.

6. The catwalk as in claim 4, wherein a maximum pressure is supplied to the cylinder that is sufficient to retract the catwalk plus a weight on the floor of the catwalk of no more than 90 pounds.

7. The catwalk as in claim 1, wherein the guide arm has an inner end for connection to the side of the vehicle/equipment, a middle arm, and an outer end fixed and immovable relative to the railing, wherein none of the guide arm is attached to or contacts the floor.

8. The catwalk as in claim 7, wherein said middle arm is pivotally connected to the inner end of the guide arm, and the outer end of the guide arm is pivotally connected to the middle arm.

9. The catwalk as in claim 1, wherein the catwalk further comprises a frame at the inner side of the catwalk for connection to the vehicle/equipment, wherein the inner edge of the floor, an inner end of the guide arm, and a top end of the actuator system, are connected to said frame.

10. The catwalk as in claim 9, wherein the frame, and the floor and the railing when the catwalk is in the deployed position, define a walkway above the floor between the frame and the railing, and wherein no portion of the actuator system extends into the walkway, and no portion of the guide arm extends into the walkway.

11. The catwalk as in claim 1, wherein the catwalk is connected to the side of the vehicle/equipment by direct connection of the floor, guide arm, and actuator system, to rigid chassis members of the vehicle/equipment.

12. The catwalk as in claim 11, wherein the side of the vehicle/equipment, and the floor and the railing, when the catwalk is in the deployed position, define a walkway above the floor between the side of the vehicle-equipment and the railing, and wherein no portion of the actuator system extends into the walkway, and no portion of the guide arm extends into the walkway.

13. The catwalk as in claim 11, wherein the actuator system extends outward only as far as an inner edge of the floor, and no portion of the guide arm extends above the floor.

14. A catwalk system comprising a plurality of catwalks, each catwalk of the plurality of catwalks being the catwalk according to claim 1, the plurality of catwalks comprising a first catwalk and a second catwalk, wherein the first catwalk is for connection to a right or left side of the vehicle/ equipment, the second catwalk is for connection to a rear side or front side of the vehicle/equipment, the floor of the first catwalk having a length and the floor of the second catwalk having a length that is perpendicular to the length of the first catwalk.

15. The catwalk system as in claim 14, wherein the first catwalk has an open end, and the second catwalk has an open end near the open end of the first catwalk, for access between the first and second catwalks by a user stepping through the opens ends from the first catwalk to the second catwalk and from the second catwalk to the first catwalk.

16. The system as in claim 14, wherein the railing and the floor of the first catwalk in the retracted position are vertical and co-planar.

17. The system as in claim 14, wherein the railing and the floor of the second catwalk in the retracted position are vertical and co-planar.

18. The system as in claim 14, wherein each of the first and second catwalks is adapted to not retract if a person is on the catwalk.

19. The system as in claim 14, wherein the guide arm of the first catwalk has an inner end for connection to the right or left side of the vehicle/equipment, a middle arm, and an outer end fixed and immovable relative to the railing of the first catwalk, wherein none of the guide arm of the first catwalk is attached to the floor of the first catwalk.

20. The system as in claim 14, wherein the guide arm of the second catwalk has an inner end for connection to the rear side or front side of the vehicle/equipment, a middle arm, and an outer end fixed and immovable relative to the railing of the second catwalk, wherein none of the guide arm of the second catwalk is attached to the floor of the second catwalk.

21. The catwalk as in claim 1, wherein the floor in the deployed floor position is within 10 degrees of horizontal.

22. The catwalk as in claim 1, wherein the guide arm system comprises multiple rigid arms that are pivotally connected together.

23. A catwalk having an inner side for connection to a side of a vehicle/equipment and an outer side facing away from the side of the vehicle/equipment, the catwalk comprising:
a floor comprising a hinge for pivotal connection to the vehicle/equipment, a railing that is pivotally connected to the floor, an actuator system that moves the catwalk from a deployed position wherein the floor is generally horizontal and the railing is generally vertical, to a retracted position wherein both the floor and railing are generally vertical and close to the side of the vehicle/ equipment with the railing being co-planar with the floor;
wherein the actuator system is connected to an inner edge of the floor at an actuator connection that is inward relative to said hinge, and the actuator system pushes down said inner edge to pivot the floor on said hinge to move an outer edge of the floor upward from a deployed floor position to a retracted floor position; and
the catwalk further comprising a guide arm adapted to maintain the railing generally perpendicular to the floor when the catwalk is in the deployed position, to control pivoting of the railing relative to the floor during the moving of the floor from the deployed floor positon to the retracted floor position; and to maintain the railing co-planar with the floor when the catwalk is in the retracted position.

24. The catwalk as in claim 23, wherein, when the catwalk is in the deployed position, the floor has a bottom side and the railing has an outer side facing away from the vehicle/ equipment, and the guide arm extends along said bottom side of the floor and up along said outer side of the railing.

25. The catwalk as in claim 23, wherein the actuator system comprises a hydraulic or pneumatic cylinder that has an upper, inner end near said inner side for pivotal connection to the vehicle/equipment, and a lower, outer end that is pivotally connected to said inner edge of the floor at said actuator connection, and wherein extension of the cylinder pivots the floor from the deployed floor position to the retracted floor position, and shortening of the cylinder pivots the floor from the retracted floor position to the deployed floor position.

26. The catwalk as in claim 25, wherein a maximum pressure is supplied to the cylinder that is sufficient to retract the catwalk only if a person is not on the catwalk.

27. The catwalk as in claim 23, wherein the catwalk further comprises a frame at the inner side of the catwalk for connection to the vehicle/equipment, wherein the inner edge of the floor, an inner end of the guide arm, and a top end of the actuator system, are connected to said frame.

28. The catwalk as in claim 27, wherein the frame, and the floor and the railing, when the catwalk is in the deployed position, define a walkway above the floor between the frame and the railing, and wherein no portion of the actuator system extends into the walkway, and no portion of the guide arm extends into the walkway.

29. The catwalk as in claim 23, wherein the catwalk is connected to the side of the vehicle/equipment by direct connection of the floor, guide arm, and actuator system, to rigid chassis members of the vehicle/equipment.

30. A catwalk system comprising a plurality of catwalks, each catwalk of the plurality of catwalks being the catwalk according to claim 23, the plurality of catwalks comprising a first catwalk and a second catwalk, wherein the first catwalk is for connection to a right or left side of the vehicle/equipment, the second catwalk is for connection to a rear side or front side of the vehicle/equipment, the floor of the first catwalk having a length and the floor of the second catwalk having a length that is perpendicular to the length of the first catwalk.

* * * * *